(12) United States Patent
Burd (10) Patent No.: US 11,286,049 B2
(45) Date of Patent: Mar. 29, 2022

(54) STANDARD UNIT MEAL BOX COMPARTMENT INCLUDING AIR CHILLER

(71) Applicant: B/E Aerospace, Inc., Winston-Salem, NC (US)

(72) Inventor: Peter J. L. Burd, Burry Port (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 216 days.

(21) Appl. No.: 16/681,179

(22) Filed: Nov. 12, 2019

(65) Prior Publication Data

US 2021/0139148 A1 May 13, 2021

(51) Int. Cl.
*B64D 11/04* (2006.01)

(52) U.S. Cl.
CPC .................................. *B64D 11/04* (2013.01)

(58) Field of Classification Search
CPC ....................................................... B64D 11/04
See application file for complete search history.

(56) References Cited

U.S. PATENT DOCUMENTS

| | | | |
|---|---|---|---|
| 4,784,054 A * | 11/1988 | Karos | A47J 39/006 219/214 |
| 7,059,148 B2 | 6/2006 | Ozaki | |
| 7,137,273 B2 | 11/2006 | Ozaki et al. | |
| 7,174,739 B2 | 2/2007 | Ozaki | |
| 7,225,631 B2 | 6/2007 | Ozaki et al. | |
| 7,231,778 B2 | 6/2007 | Rigney et al. | |
| 7,251,952 B2 | 8/2007 | Ozaki | |
| 7,954,761 B2 * | 6/2011 | Johnson | A47B 31/02 244/118.5 |
| 9,676,483 B2 | 6/2017 | Godecker et al. | |
| 10,214,292 B2 | 2/2019 | Colberg et al. | |
| 2009/0044547 A1 * | 2/2009 | Oswald | F25D 17/06 62/89 |
| 2010/0224726 A1 | 9/2010 | Lu et al. | |
| 2013/0047657 A1 * | 2/2013 | Oswald | B64D 13/06 62/407 |
| 2013/0048264 A1 * | 2/2013 | Lu | F25D 17/02 165/287 |
| 2013/0259612 A1 * | 10/2013 | Guering | B64D 11/04 414/260 |
| 2013/0260662 A1 * | 10/2013 | Burd | B62B 3/003 454/143 |
| 2013/0269384 A1 * | 10/2013 | Burd | B64D 13/08 62/285 |

(Continued)

FOREIGN PATENT DOCUMENTS

WO     2013149143 A1    10/2013

OTHER PUBLICATIONS

Extended Search Report for European Application No. 20207307.8 dated Mar. 17, 2021, 7 pages.

*Primary Examiner* — Gordon A Jones
(74) *Attorney, Agent, or Firm* — Suiter Swantz pc llo (57) ABSTRACT

A system may include an aircraft galley, which may include a standard unit meal box compartment configured to hold a standard unit meal box. The standard unit meal box compartment may include a door at a front of the standard unit meal box compartment and an air chiller near a rear of the standard unit meal box compartment. The air chiller may be configured to provide chilled air within the standard unit meal box compartment.

14 Claims, 11 Drawing Sheets

(56) References Cited

U.S. PATENT DOCUMENTS

| | | | | |
|---|---|---|---|---|
| 2013/0344789 A1* | 12/2013 | Lee | ..................... | B64D 11/04 |
| | | | | 454/76 |
| 2015/0266353 A1 | 9/2015 | Lu et al. | | |
| 2016/0231030 A1 | 8/2016 | Lu et al. | | |
| 2017/0122647 A1* | 5/2017 | Burd | ................. | B64D 11/0007 |
| 2018/0201374 A1* | 7/2018 | Trumper | ................ | F25D 23/12 |

\* cited by examiner

STANDARD UNIT MEAL BOX COMPARTMENT INCLUDING AIR CHILLER

BACKGROUND

On current aircraft galleys, standard unit meal boxes are used to transport perishable food and beverages. Typically, the compartments, where the standard unit meal boxes are stowed, are unchilled, which limits the types of fresh food that may be carried without the risk of the fresh food spoiling and posing a health risk on long haul flights.

SUMMARY

In one aspect, embodiments of the inventive concepts disclosed herein are directed to a system. The system may include an aircraft galley, which may include a standard unit meal box compartment configured to hold a standard unit meal box. The standard unit meal box compartment may include a door at a front of the standard unit meal box compartment and an air chiller near a rear of the standard unit meal box compartment. The air chiller may be configured to provide chilled air within the standard unit meal box compartment.

In a further aspect, embodiments of the inventive concepts disclosed herein are directed to a method. The method may include providing an aircraft galley comprising a standard unit meal box compartment configured to hold at least one standard unit meal box, the standard unit meal box compartment comprising a door at a front of the standard unit meal box compartment and an air chiller near a rear of the standard unit meal box compartment. The method may further include providing, by the air chiller, chilled air within the standard unit meal box compartment.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system configured to provide chilled air within a standard unit meal box compartment. Some embodiments may include a standard unit meal box compartment including an air chiller that would provide an environment to preserve high-risk perishable foods. Some embodiments may allow for a greater volume of fresh produce to be carried on an aircraft galley for a longer period of time and/or may provide a means of chilling additional beverages without adding an additional galley insert (GAIN) refrigerator.

Figure 1:
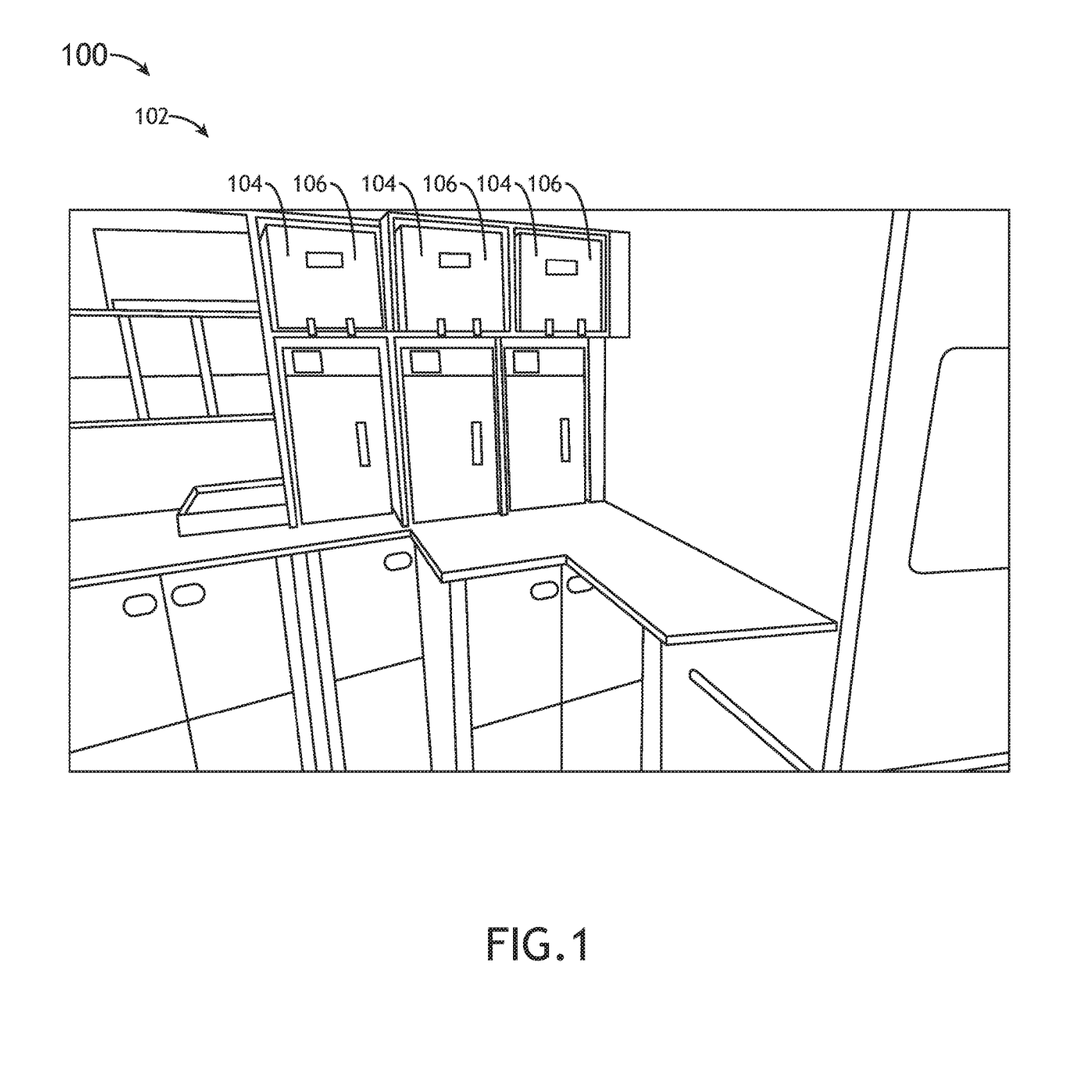
FIG. 1 is a view of an exemplary embodiment of a system including a galley according to the inventive concepts disclosed herein.
Figure 2:
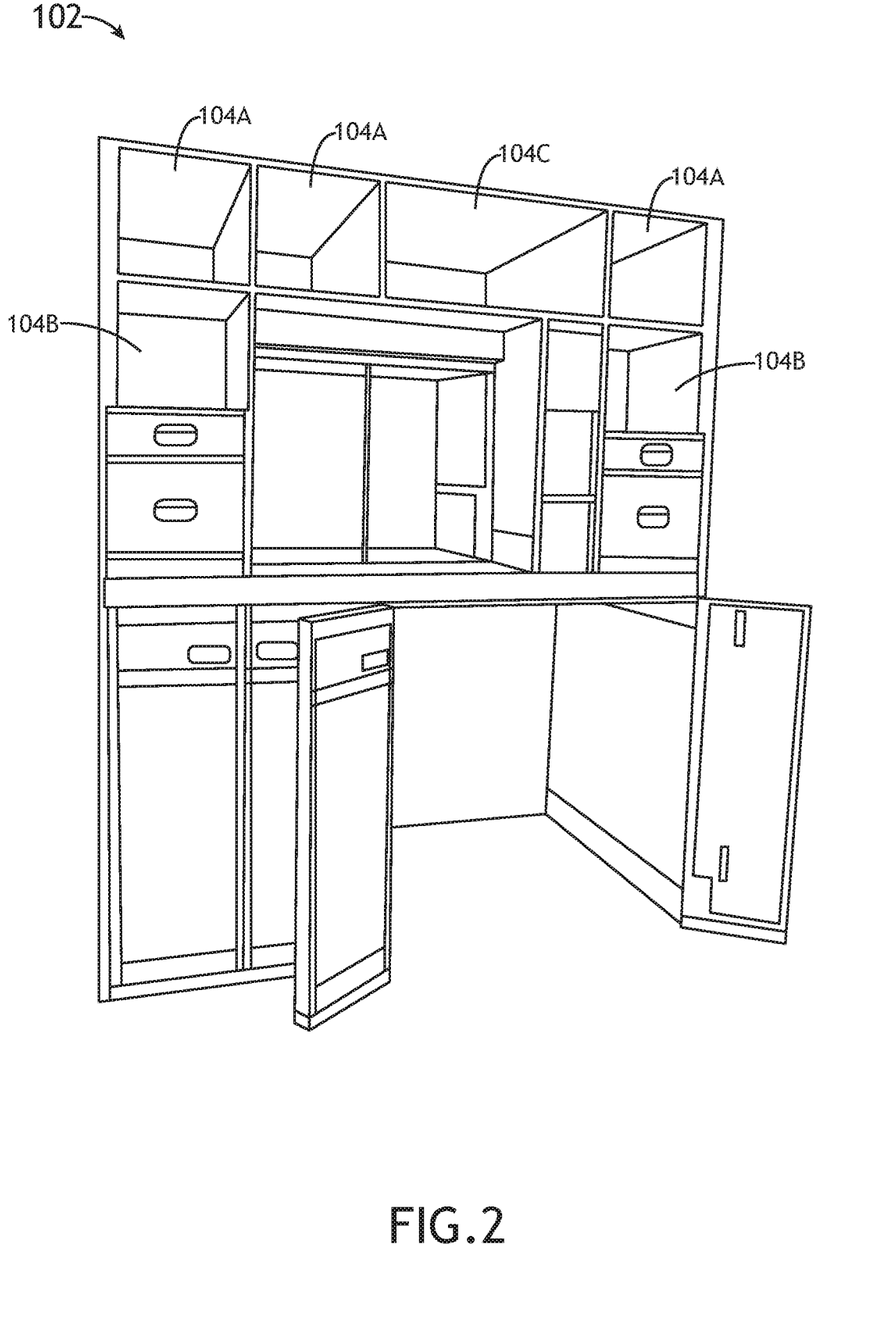
FIG. 2 is a view of an exemplary embodiment of a system including a galley according to the inventive concepts disclosed herein.
Figure 3:
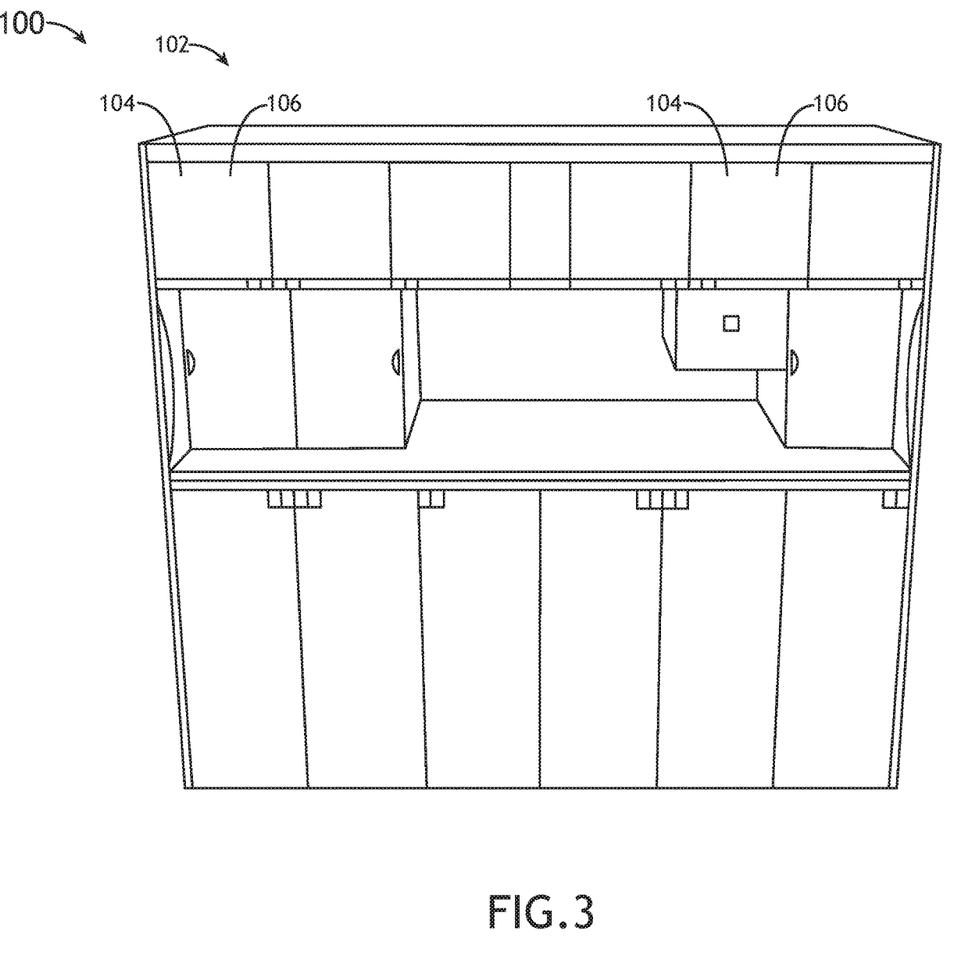
FIG. 3 is a view of an exemplary embodiment of a system including a galley according to the inventive concepts disclosed herein.

Referring now to FIGS. 1-3, exemplary embodiments of a system including a vehicle (e.g., an automobile, a train, a watercraft, a submarine, an aircraft 100) including at least one galley 102 are depicted according to the inventive concepts. For example, the aircraft 100 may include the galley 102. The galley 102 may include standard unit meal box compartments 104. Each of the standard unit meal box compartments 104 may include a rear wall, side walls, and a door 106 at a front of each standard unit meal box compartment 104. Each of the standard unit meal box compartments 104 may be configured to hold at least one standard unit meal box 108. In some embodiments, the standard unit meal box compartments 104 may include at least one chilled air system, such as shown in and described with respect to FIGS. 8-11.

For example, as shown in FIG. 2, each of the standard unit meal box compartments 104 may be configured to hold at least one standard unit meal box 108. The standard unit meal box compartments 104 may include single width double depth standard unit meal box compartments 104A configured to hold two standard unit meal boxes 108. The standard unit meal box compartments 104 may include single width single depth standard unit meal box compartments 104B configured to hold one standard unit meal box 108. The standard unit meal box compartments 104 may include double width double depth standard unit meal box compartments 104C configured to hold four standard unit meal boxes 108.

Figure 4:
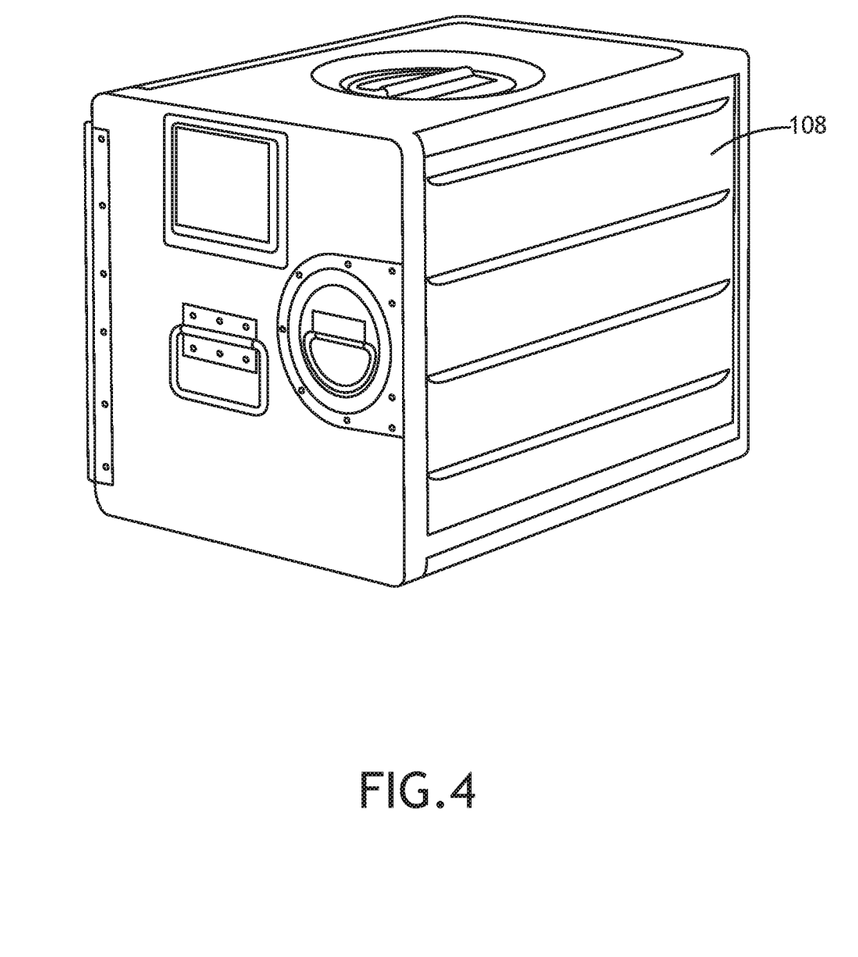
FIGS. 4, 5, 6, and 7 are views of an exemplary standard unit meal box according to the inventive concepts disclosed herein.
Figure 5:
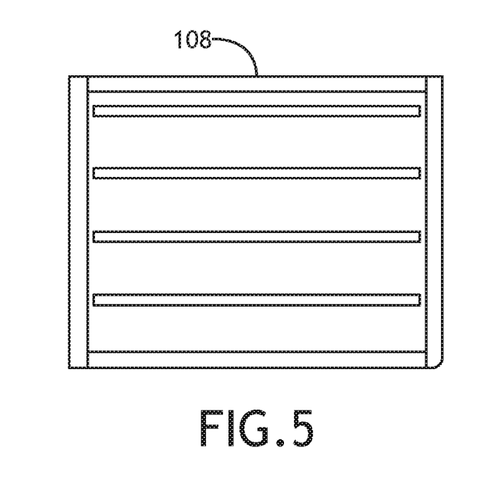
Figure 6:
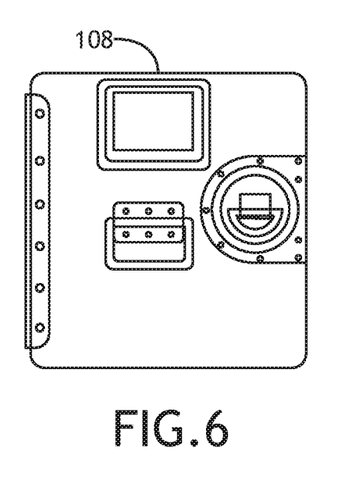
Figure 7:
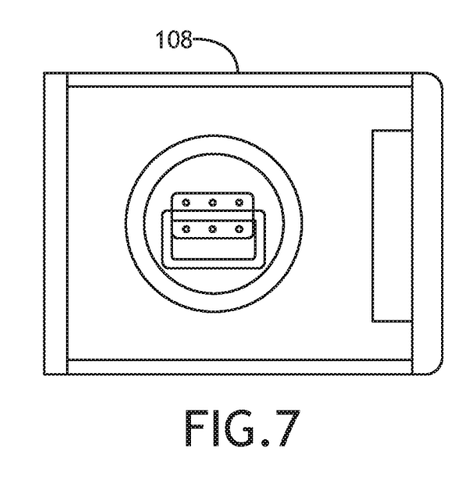
Figure 13:
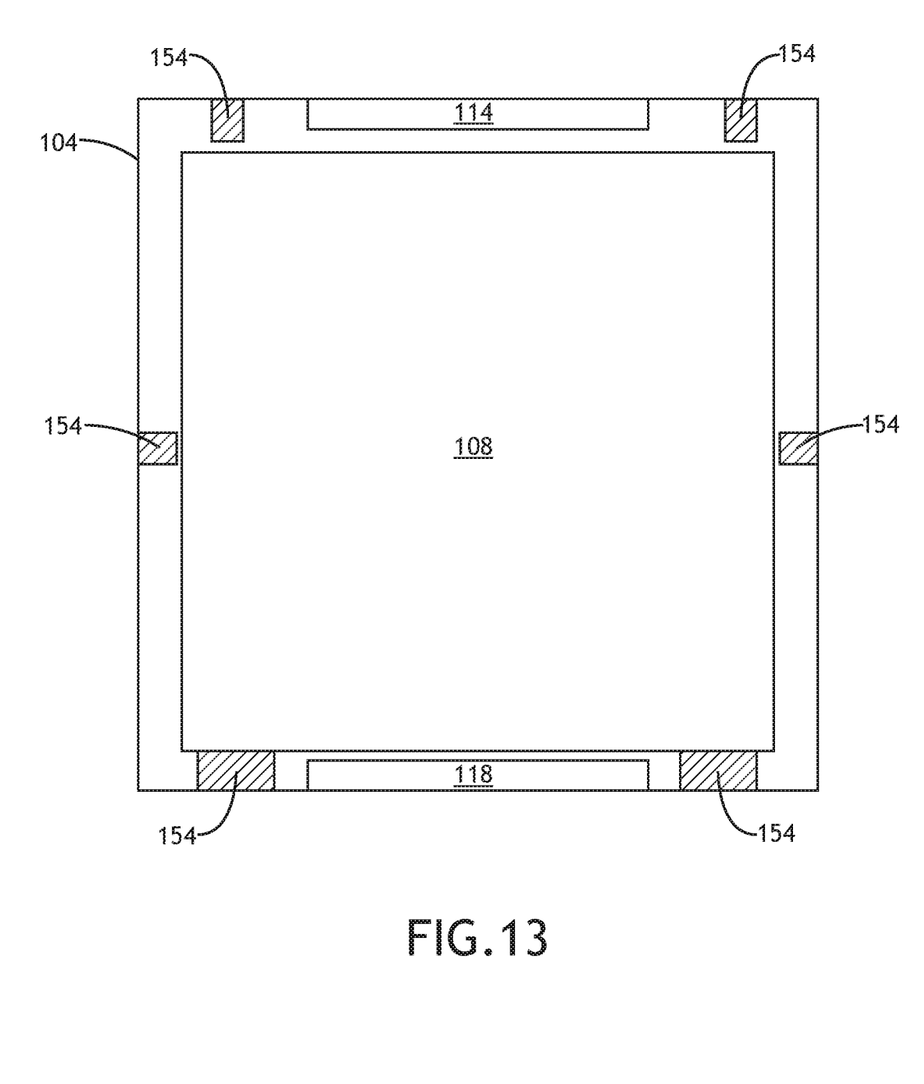
FIG. 13 is a view of a standard unit meal box compartment including rub strips and holding a standard unit meal box of some embodiments according to the inventive concepts disclosed herein.

Referring now to FIGS. 4-7, views of a standard unit meal box 108 of some embodiments according to the inventive concepts disclosed herein are depicted. FIG. 4 shows an isometric view of the standard unit meal box 108. FIG. 5 shows a side view of the standard unit meal box 108. FIG. 6 shows a front view of the standard unit meal box 108. FIG. 7 shows a top view of the standard unit meal box 108. In some embodiments, the standard unit meal box 108 may have approximate (e.g., +/−10%) dimensions of 394 millimeters (mm) by 279 mm by 288 mm. The standard unit meal box 108 may include handles on the top and front of the standard unit meal box 108. The standard unit meal box 108 may be placed within the standard unit meal box compartment 104. Typically, the standard unit meal box 108 may be a reinforced aluminum metal container with a door at one end for transporting food on the aircraft 100. For example, the standard unit meal box 108 may be an ATLAS standard, standard unit meal box. The standard unit meal box 108 may be designed to fit in the standard unit meal box compartment 104 (e.g., a standard ARINC standard unit compartment) in galleys 102. For example, the standard unit meal box 108 may be approximately 25-30 mm less in width and height than a single width standard unit meal box compartment 104. The space between the inner walls of the standard unit meal box compartment 104 and the outer walls of the standard unit meal box 108 may be used to circulate chilled air around the standard unit meal box 108 and within the standard unit meal box compartment 104 to chill the standard unit meal box 108. The standard unit meal box compartments 104 may have rub strips 154 (e.g., plastic rub strips) on four sides (e.g., top, bottom, and two side walls), such as shown in FIG. 13. The rub strips 154 may be 8-10 mm in depth and may be installed in pairs on the top and bottom of the standard unit meal box compartments 104.

Figure 8:
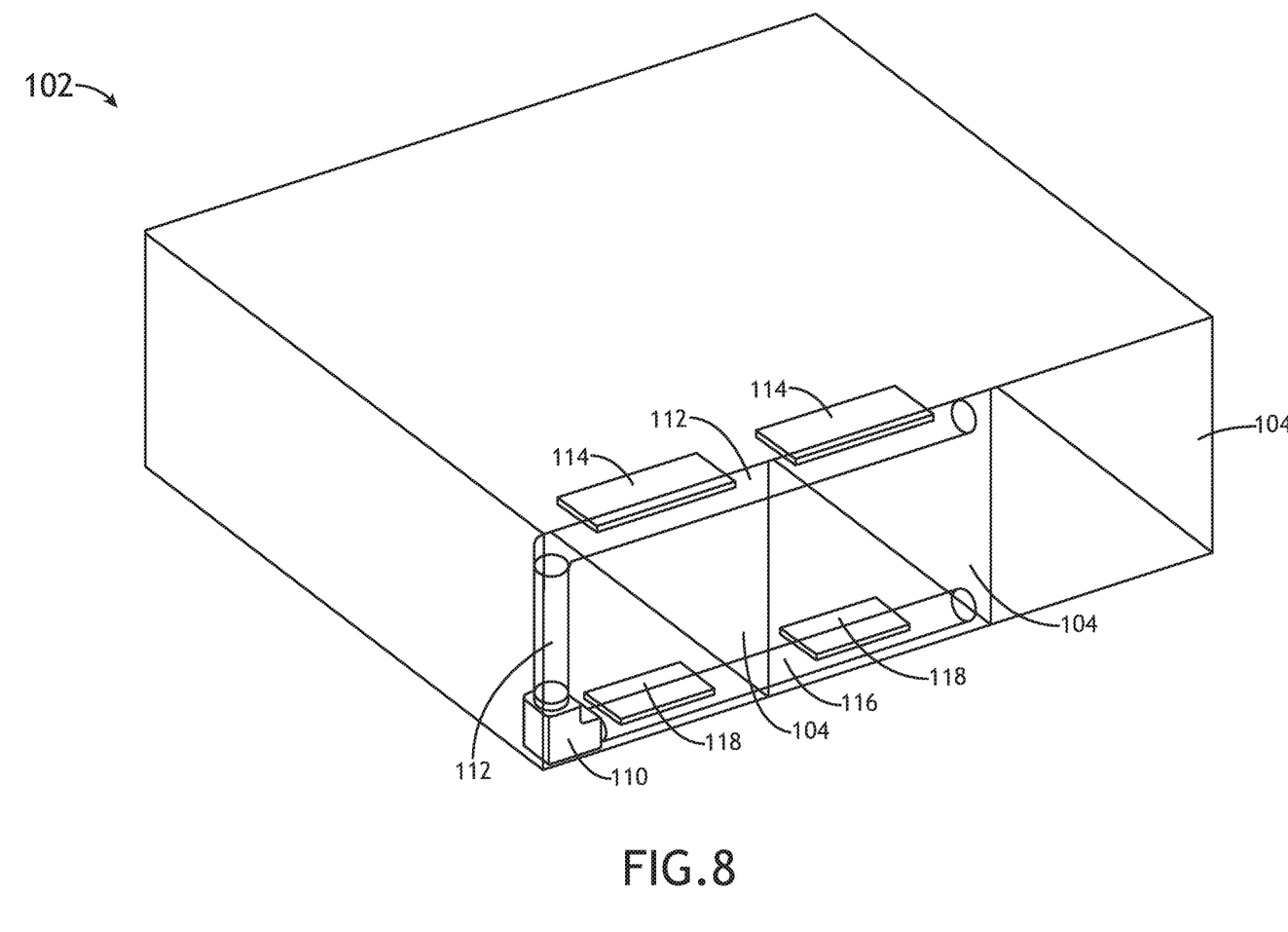
FIG. 8 is a view of standard unit meal box compartments including a chilled air system of some embodiments according to the inventive concepts disclosed herein.

Referring now to FIG. 8, a view of standard unit meal box compartments 104 including a chilled air system of some embodiments according to the inventive concepts disclosed herein is depicted. For example, one, some, or all of the standard unit meal box compartments 104 may include an air chiller 110 near (e.g., at) a rear of a particular standard unit meal box compartment 104, and the air chiller 110 may be configured to provide chilled air within one, some, or all of the standard unit meal box compartments 104. For example, the air chiller 110 may be positioned at a bottom rear corner of the standard unit meal box compartment 104. In some embodiments, each standard unit meal box compartment 104 includes an air chiller 110.

For example, as shown in FIG. 8, supply air ducting 112 and return air ducting 116 may be installed within one, some, or all of the standard unit meal box compartments 104. The supply air ducting 112 and the return air ducting 116 may be installed in unused space behind the standard unit meal box 108, when the standard unit meal box 108 is placed within the standard unit meal box compartment 104. Chilled air may be supplied to one, some, or all of the standard unit meal box compartments 104 from the air chiller 110 via the supply air ducting 112. Return air may be returned from one, some, or all of the standard unit meal box compartments 104 to the air chiller 110 via the return air ducting 116. For example, the supply air ducting 112 and the return air ducting 116 may extend from one standard unit meal box compartment 104 to a second standard unit meal box compartment 104. For example, each of the standard unit meal box compartments 104 may include a supply air outlet 114 and a return air inlet 118. The supply air outlet 114 may be coupled to the supply air ducting 112, and the return air inlet 118 may be coupled to the return air ducting 116. In some embodiments, the supply air outlets 114 may be located at tops of the standard unit meal box compartments 104, and the return air inlets 118 may be located at bottoms of the standard unit meal box compartments 104. For example, as shown in FIG. 13, each return air inlet 118 and each supply air outlet 114 may have a width greater than a height and may be positioned between a pair of rub strips 154 such that chilled air flows from the supply air outlet 114 above the standard unit meal box 108 toward the front of the standard unit meal box compartment 104 and is returned from the front of the standard unit meal box compartment 104 under the standard unit meal box 108 to the return air inlet 118. As shown in FIG. 8, a single air chiller 110 may provide chilled air to two or more standard unit meal box compartments 104; however, in some embodiments, each standard unit meal box compartment 104 may include an air chiller 110. In some embodiments, the air chiller 110 may be installed in unused space behind the standard unit meal box 108, when the standard unit meal box 108 is placed within the standard unit meal box compartment 104. In some embodiments, the air chiller 110 may be installed outside of the standard unit meal box compartment 104, such as on the galley roof or on the back wall behind the standard unit meal box compartments 104.

Figure 9:
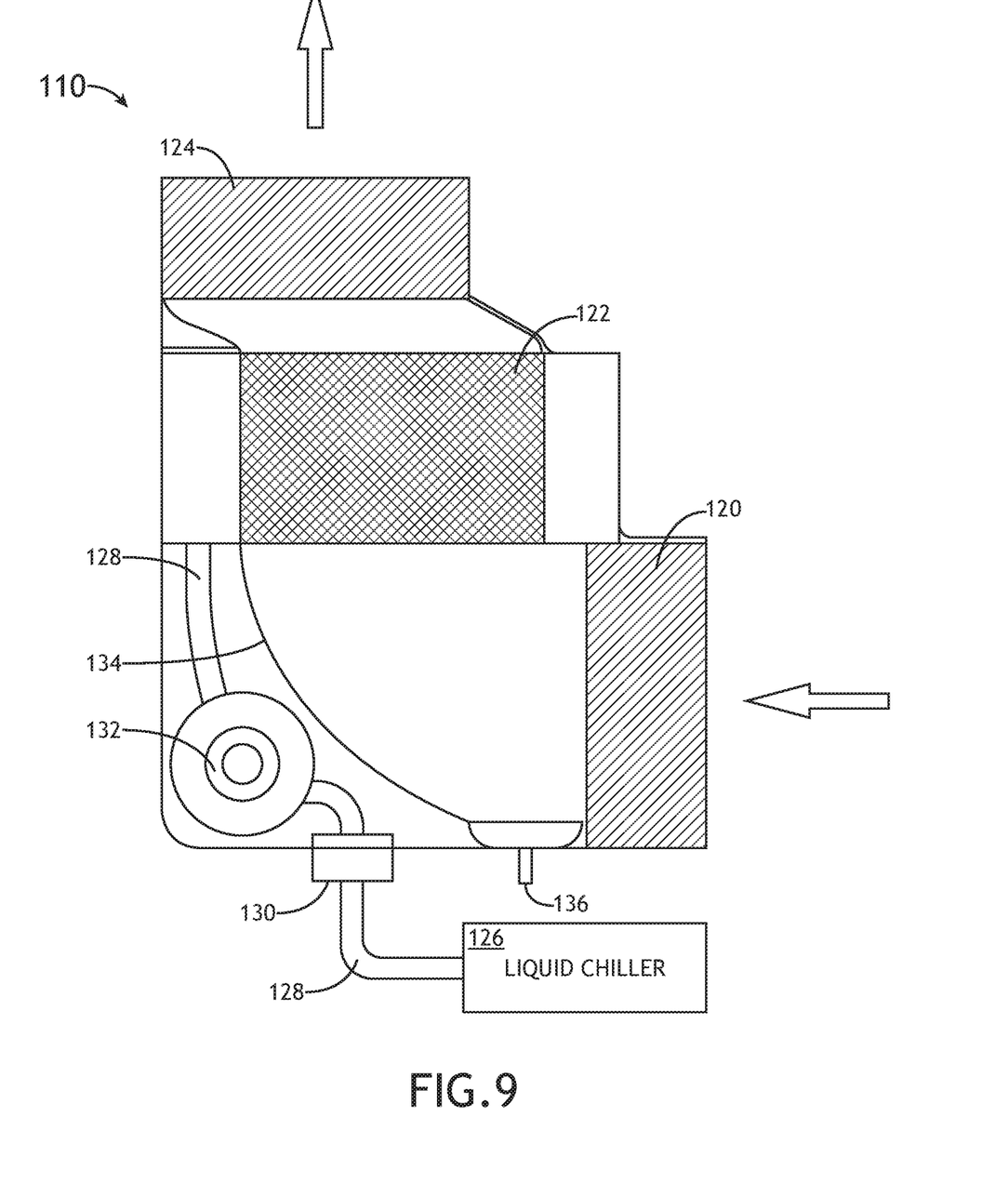
FIG. 9 is an exemplary view of the chilled air system of FIG. 8 of some embodiments according to the inventive concepts disclosed herein.

Referring now to FIG. 9, an exemplary view of the chilled air system of FIG. 8 of some embodiments according to the inventive concepts disclosed herein is depicted. The chilled air system may include the air chiller 110 (as shown by a side partial see-through view) and a liquid chiller 126.

The air chiller 110 may include at least one fan (e.g., fan 120 and/or fan 124), at least one heat exchanger 122, chilled liquid lines 128 (e.g., chilled liquid supply and return lines), connectors 130 (e.g., quick disconnectors), a bypass valve 132, at least one baffle 134, and/or a condensate drain 136. In some embodiments, the air chiller 110 may have dimensions of less than 8 inches by less than 6 inches by less than 5 inches (e.g., 7 inches by 5 inches by 4 inches).

The chilled liquid supply line may provide chilled liquid to the heat exchanger 122, and the chilled liquid return line may return chilled liquid from the heat exchanger 122 to the liquid chiller 126. In some embodiments, the chilled liquid may be propylene glycol water (PGW). The liquid chiller 126 may be coupled to the chilled liquid supply line and the chilled liquid return line. In some embodiments, the liquid chiller 126 may be installed outside of the standard unit meal box compartment 104; however, in some embodiments, the liquid chiller 126 may be installed in the standard unit meal box compartment 104.

The bypass valve 132 may be coupled to the chilled liquid supply line. In some embodiments, the bypass valve 132 may be a liquid proportioning bypass valve. When activated, the bypass valve 132 may be configured to direct (e.g., in part or in whole) a flow of the chilled liquid to bypass the heat exchanger 122. In some embodiments, a controller (e.g., 146) may be configured to control operation of the bypass valve 132 based at least on at least one detected temperature of at least one temperature sensor (e.g., 152).

The at least one fan (e.g., 120 and/or 124) may be configured to pull return air from the return air ducting 116. The at least one fan (e.g., 120 and/or 124) may be further configured to at least one of blow or pull air over the heat exchanger 122 causing the air to be chilled as chilled air. The at least one fan (e.g., 120 and/or 124) may be further configured to blow the chilled air out of the air chiller 110 into the supply air ducting 112. Some embodiments may include two axial fans 120, 124. In some embodiments, a controller (e.g., 146) may be configured to control operation of the at least one fan (e.g., 120 and/or 124) based at least on at least one detected temperature of at least one temperature sensor (e.g., 152).

Figure 10:
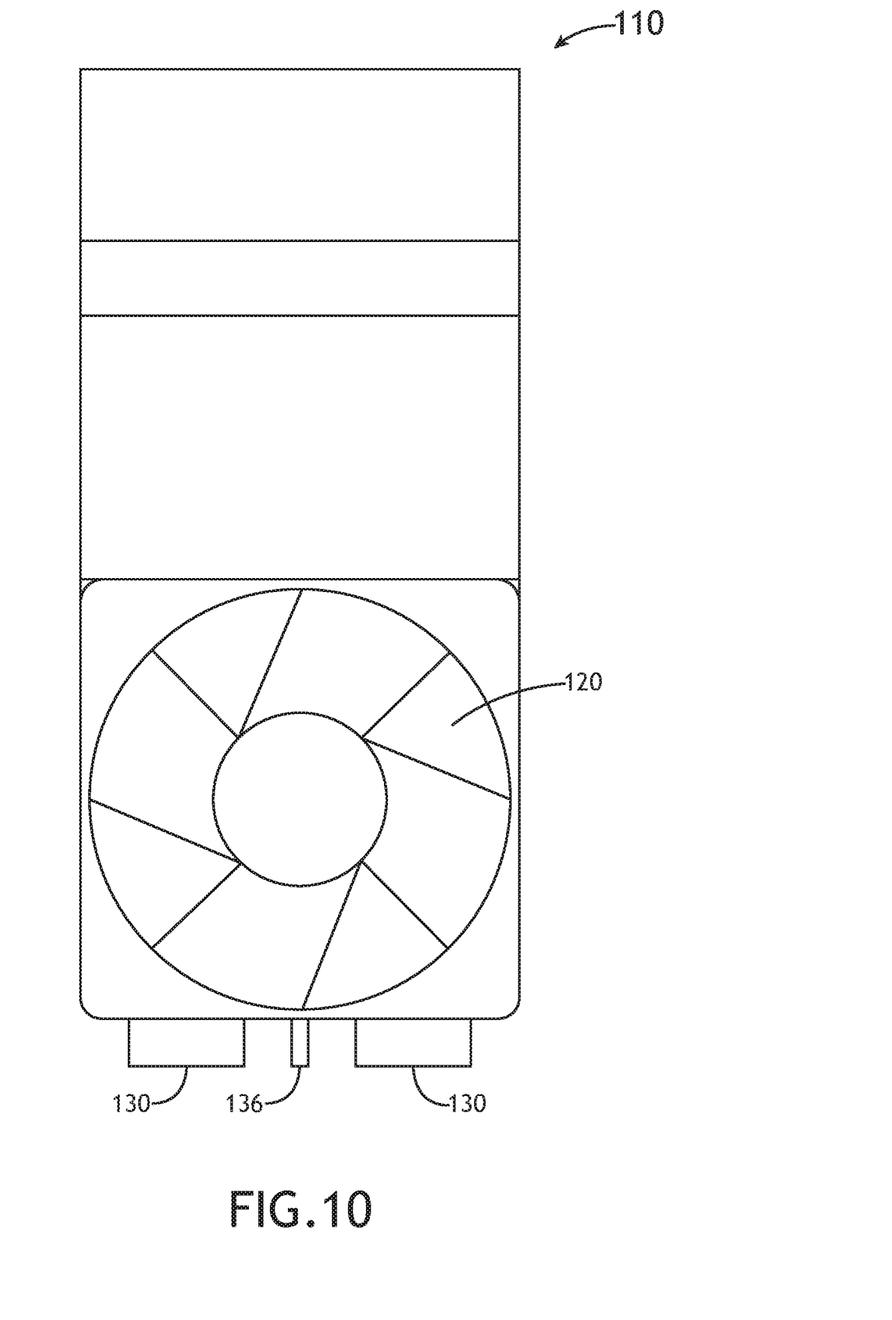
FIG. 10 is an exemplary view of the air chiller of FIGS. 8-9 of some embodiments according to the inventive concepts disclosed herein.

Referring now to FIG. 10, a view of the air inlet side of the air chiller 110 of FIGS. 8-9 of some embodiments according to the inventive concepts disclosed herein is depicted.

Figure 11:
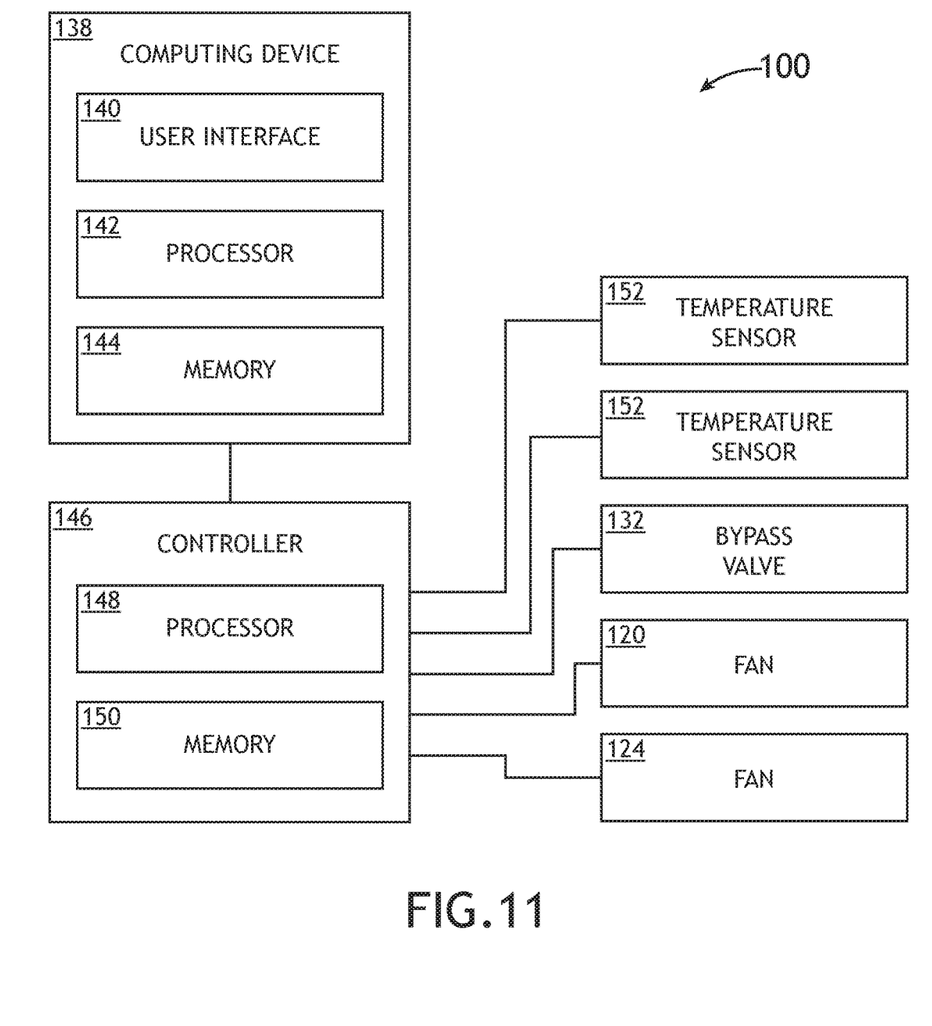
FIG. 11 is an exemplary view of a system including an aircraft including a galley of some embodiments according to the inventive concepts disclosed herein.

Referring now to FIG. 11, an exemplary embodiment of a system including the aircraft 100 including the at least one galley 102 is depicted according to the inventive concepts. The system may include at least one computing device 138, at least one controller 146, at least one temperature sensor 152, at least one bypass valve 132, and/or at least one fan (e.g., fan 120 and/or 124), some or all of which may be communicatively coupled at any given time. In some embodiments, the at least one computing device 138 and the at least one controller 146 may be implemented as a single computing device or as any number of computing devices.

The at least one temperature sensor 152 may be configured to detect at least one air temperature of at least one of: the standard unit meal box compartment 104, the supply air ducting 112, and/or the return air ducting 116.

The computing device 138 may include at least one user interface 138, at least one processor 142, and/or at least one memory 144, some or all of which may be communicatively (e.g., wirelessly) coupled at any given time.

The at least one user interface 138 may be implemented as any suitable user interface(s), such as a display(s) (e.g., a touchscreen display), button(s), a voice recognition system, an eye tracking system, a keyboard, a mouse, and/or the like. For example, the at least one user-interface 138 may be configured to present information (e.g., a power status (e.g., on or off) of the air chiller 110 (or its components) and/or a temperature) of one or more of the standard unit meal box compartments 104. For example, the at least one user-interface 138 may be configured to interface with a user and receive user inputs, which, for example, may include instructions to change a power status (e.g., on or off) of the air chiller 110 (or its components) and/or a temperature of one or more of the standard unit meal box compartments 104. For example, the at least one user-interface 138 may be configured to output the user inputs to the processor 142.

The processor 142 may be configured to perform any or all of the operations disclosed throughout. The computing device 142 may be implemented as any suitable computing device. The processor 142 may be configured to run various software applications or computer code stored (e.g., maintained) in a non-transitory computer-readable medium (e.g., memory 144) and configured to execute various instructions or operations. For example, the processor 142 may be configured to receive user inputs from the user interface 140. Based on the user inputs, the processor 142 may be configured to determine any operational changes (e.g., to change a power status (e.g., on or off) of the air chiller 110 (or its components) and/or a temperature of one or more of the standard unit meal box compartments 104) to be made to the air chiller 110. The processor 142 may be configured to output instructions to the controller 146 to perform the operational changes.

The controller 146 may include at least one processor 148 and at least one memory 150, which may be communicatively coupled. The processor 148 may be implemented as any suitable processor, such as a general purpose processor or a field-programmable gate array (FPGA). The processor 148 may be configured to run various software applications or computer code stored (e.g., maintained) in a non-transitory computer-readable medium (e.g., memory 150) and configured to execute various instructions or operations. The processor 148 may be implemented as a special purpose processor configured (e.g., programmed) to execute instructions for performing any or all of the operations disclosed throughout.

For example, the processor 148 may be configured to control operation of the air chiller 110 and/or components of the air chiller 110. For example, the processor 148 may be configured to change a power status (e.g., on or off) of the air chiller 110 (or its components) and/or a change a temperature of one or more of the standard unit meal box compartments 104. For example, the processor 148 may be configured to control operation of the at least one fan (e.g., 120 and/or 124) based at least on the at least one detected temperature of the at least one temperature sensor 152. For example, the processor 148 may be configured to control operation of the bypass valve 132 based at least on the at least one detected temperature of the at least one temperature sensor 152.

Figure 12:
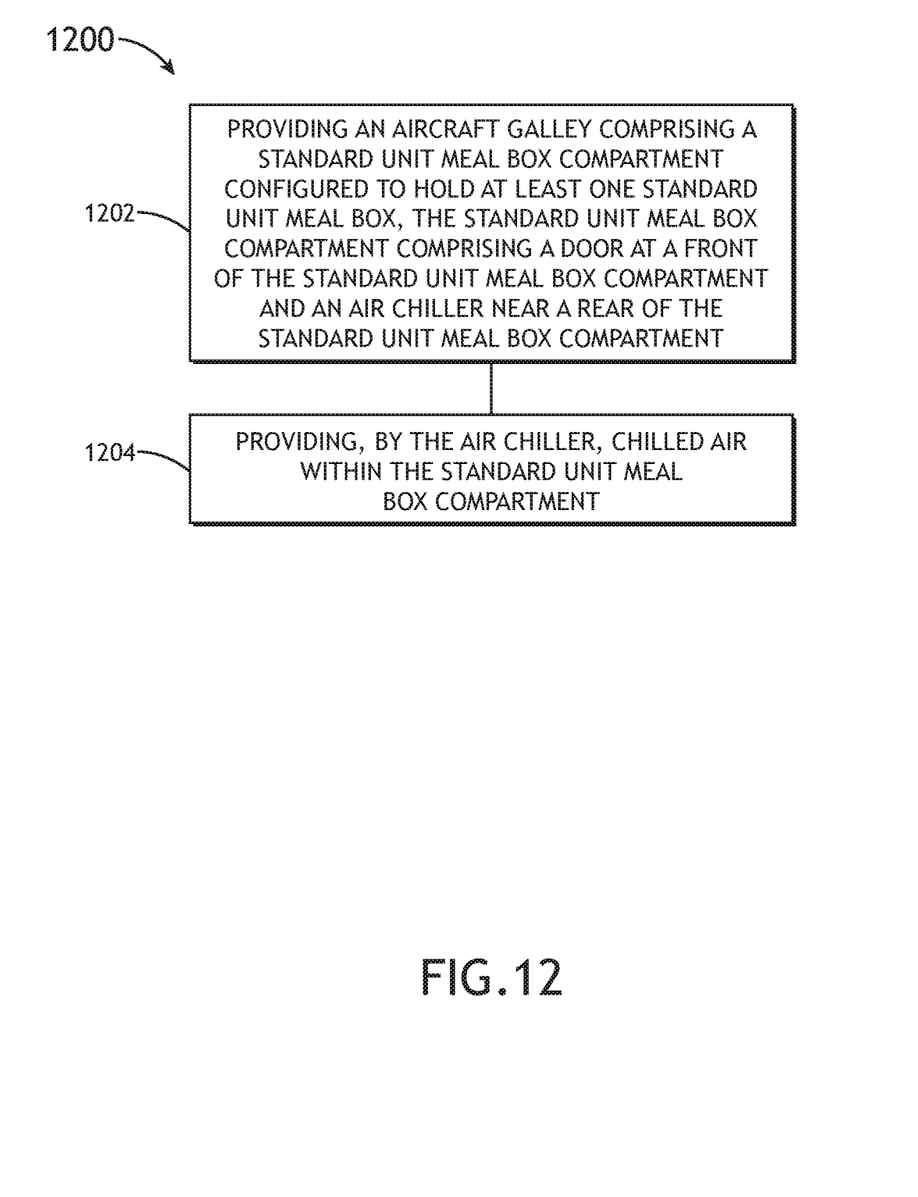
FIG. 12 is a diagram of an exemplary embodiment of a method according to the inventive concepts disclosed herein.

Referring now to FIG. 12, an exemplary embodiment of a method 1200 according to the inventive concepts disclosed herein may include one or more of the following steps. Additionally, for example, some embodiments may include performing one or more instances of the method 1200 iteratively, concurrently, non-sequentially, and/or sequentially.

A step 1202 may include providing an aircraft galley comprising a standard unit meal box compartment configured to hold at least one standard unit meal box, the standard unit meal box compartment comprising a door at a front of the standard unit meal box compartment and an air chiller near a rear of the standard unit meal box compartment.

A step 1204 may include providing, by the air chiller, chilled air within the standard unit meal box compartment.

Further, the method 1200 may include any of the operations disclosed throughout.

As will be appreciated from the above, embodiments of the inventive concepts disclosed herein may be directed to a method and a system configured to provide chilled air within a standard unit meal box compartment.

As used throughout and as would be appreciated by those skilled in the art, "at least one non-transitory computer-readable medium" may refer to as at least one non-transitory computer-readable medium (e.g., memory, storage, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
an aircraft galley, comprising:
a standard unit meal box compartment configured to hold at least one standard unit meal box, the standard unit meal box compartment comprising:
a door at a front of the standard unit meal box compartment;
an air chiller near a rear of the standard unit meal box compartment, the air chiller configured to provide chilled air within the standard unit meal box compartment;
supply air ducting and return air ducting, wherein chilled air is supplied to the standard unit meal box compartment from the air chiller via the supply air ducting, wherein return air is returned from the standard unit meal box compartment to the air chiller via the return air ducting; and
a supply air outlet and a return air inlet, the supply air outlet coupled to the supply air ducting, the return air inlet coupled to the return air ducting, wherein the supply air outlet is at a top of the standard unit meal box compartment, wherein the return air inlet is at a bottom of the standard unit meal box compartment, wherein the supply air outlet is positioned between a first pair of rub strips such that chilled air flows from the supply air outlet above the standard unit meal box toward the front of the standard unit meal box compartment, wherein the return air inlet is positioned between a second pair of rub strips such that the chilled air is returned from the front of the standard unit meal box compartment under the standard unit meal box to the return air inlet.

2. The system of claim 1, wherein the air chiller has dimensions of less than 8 inches by less than 6 inches by less than 5 inches.

3. The system of claim 1, wherein the aircraft galley further comprises a second standard unit meal box compartment, wherein the supply air ducting and the return air ducting extends from the standard unit meal box compartment to the second standard unit meal box compartment, wherein the second standard unit meal box compartment comprises a second supply air outlet and a second return air inlet, the second supply air outlet coupled to the supply air ducting, the second return air inlet coupled to the return air ducting, wherein the air chiller is further configured to provide chilled air within the standard unit meal box compartment and the second standard unit meal box compartment.

4. The system of claim 1, wherein the air chiller comprises at least one fan, a heat exchanger, a chilled liquid supply line, and a chilled liquid return line, wherein the chilled liquid supply line provides chilled liquid to the heat exchanger, wherein the at least one fan is configured to at least one of blow or pull air over the heat exchanger causing the air to be chilled as the chilled air, wherein the at least one fan is further configured to blow the chilled air out of the air chiller.

5. The system of claim 4, wherein the at least one fan is two fans.

6. The system of claim 4, wherein the at least one fan is at least one axial fan.

7. The system of claim 4, further comprising a liquid chiller coupled to the chilled liquid supply line and the chilled liquid return line, the liquid chiller configured to supply the chilled liquid to the chilled liquid supply line and receive returned chilled liquid from the chilled liquid return line.

8. The system of claim 4, further comprising a controller configured to control operation of the air chiller.

9. The system of claim 8, wherein the standard unit meal box compartment further comprises at least one temperature sensor configured to detect at least one temperature of at least one of the standard unit meal box compartment, supply air ducting, or return air ducting.

10. The system of claim 9, wherein the controller is further configured to control operation of the at least one fan based at least on the at least one detected temperature of the at least one temperature sensor.

11. The system of claim 9, wherein the air chiller further comprises a bypass valve coupled to the chilled liquid supply line, when activated the bypass valve being configured to direct a flow of the chilled liquid to bypass the heat exchanger, wherein the controller is further configured to control operation of the bypass valve based at least on the at least one detected temperature of the at least one temperature sensor.

12. A method, comprising:
providing an aircraft galley comprising a standard unit meal box compartment configured to hold at least one standard unit meal box, the standard unit meal box compartment comprising a door at a front of the standard unit meal box compartment and an air chiller near a rear of the standard unit meal box compartment, the standard unit meal box compartment further comprising supply air ducting and return air ducting, wherein chilled air is supplied to the standard unit meal box compartment from the air chiller via the supply air ducting, wherein return air is returned from the standard unit meal box compartment to the air chiller via the return air ducting, the standard unit meal box compartment further comprising a supply air outlet and a return air inlet, the supply air outlet coupled to the supply air ducting, the return air inlet coupled to the return air ducting, wherein the supply air outlet is at a top of the standard unit meal box compartment, wherein the return air inlet is at a bottom of the standard unit meal box compartment, wherein the supply air outlet is positioned between a first pair of rub strips such that chilled air flows from the supply air outlet above the standard unit meal box toward the front of the standard unit meal box compartment, wherein the return air inlet is positioned between a second pair of rub strips such that the chilled air is returned from the front of the standard unit meal box compartment under the standard unit meal box to the return air inlet; and providing, by the air chiller, chilled air within the standard unit meal box compartment.

13. The system of claim 11, wherein the air chiller comprises at least one fan, a heat exchanger, a chilled liquid supply line, and a chilled liquid return line, wherein the chilled liquid supply line provides chilled liquid to the heat exchanger, wherein the at least one fan is configured to at least one of blow or pull air over the heat exchanger causing the air to be chilled as the chilled air, wherein the at least one fan is further configured to blow the chilled air out of the air chiller.

14. The system of claim 13, wherein the at least one fan is at least one axial fan.

* * * * *